United States Patent
Broderick et al.

(10) Patent No.: US 9,442,819 B2
(45) Date of Patent: Sep. 13, 2016

(54) METHOD AND APPARATUS FOR STORING TRACE DATA

(71) Applicants: Damon Peter Broderick, Munich (DE); Dirk Heisswolf, Munich (DE); Andreas Ralph Pachl, Neubiberg (DE)

(72) Inventors: Damon Peter Broderick, Munich (DE); Dirk Heisswolf, Munich (DE); Andreas Ralph Pachl, Neubiberg (DE)

(73) Assignee: Freescale Semiconductor, Inc., Austin, TX (US)

( * ) Notice: Subject to any disclaimer, the term of this patent is extended or adjusted under 35 U.S.C. 154(b) by 286 days.

(21) Appl. No.: 14/172,684

(22) Filed: Feb. 4, 2014

(65) Prior Publication Data

US 2015/0220393 A1 Aug. 6, 2015

(51) Int. Cl.
G06F 11/00 (2006.01)
G06F 11/34 (2006.01)
G06F 11/36 (2006.01)
G06F 11/08 (2006.01)

(52) U.S. Cl.
CPC ......... *G06F 11/3476* (2013.01); *G06F 11/364* (2013.01); *G06F 11/3648* (2013.01); *G06F 11/08* (2013.01)

(58) Field of Classification Search
CPC ........... G06F 11/3636; G06F 11/3476; G06F 11/08; G06F 11/348; G06F 11/3466; G06F 11/3648; G01R 31/31705
See application file for complete search history.

(56) References Cited

U.S. PATENT DOCUMENTS

| | | | | | |
|---|---|---|---|---|---|
| 5,642,478 | A | * | 6/1997 | Chen | G06F 11/3495 714/25 |
| 7,802,142 | B2 | * | 9/2010 | Barlow | G06F 11/2294 714/30 |
| 8,001,432 | B2 | | 8/2011 | Orbach et al. | |
| 8,074,131 | B2 | * | 12/2011 | Kurts | G01R 31/31705 703/23 |
| 8,914,677 | B2 | * | 12/2014 | Bohling | G06F 11/3476 714/35 |
| 2012/0066551 | A1 | * | 3/2012 | Palus | G06F 11/3636 714/39 |

OTHER PUBLICATIONS

Hood et al., Efficient tracing for on the fly space-time displays in a debugger for message passing programs, 2003, NASA Ames Research center, pp. 1 to 10 (retrieved from google.com Jan. 7, 2015).*

Freescale Semiconductor, Inc.; MC9S12ZVM—Family Reference Manual; HCS12 Microcontrollers; Rev. 1.1, Chapters 1, 3, 5, 6, and 7; Dec. 18, 2012; downloaded from <<http://cache.freescale.com/files/microcontrollers/doc/ref_manual/MC9S12ZVMRMV1_1.pdf>>on Feb. 4, 2014; 189 pages.

* cited by examiner

Primary Examiner — Shelly A Chase

(57) ABSTRACT

A method and apparatus for storing trace data within a processing system. The method includes configuring at least one Error Correction Code, ECC, component within the processing system to operate in a trace data storage operating mode, generating trace data at a debug module of the processing system, and conveying the trace data from the debug module to the at least one ECC component for storing in an area of memory used for ECC information.

20 Claims, 6 Drawing Sheets

//  METHOD AND APPARATUS FOR STORING TRACE DATA

FIELD OF THE INVENTION

This invention relates to a method and apparatus for storing trace data within a processing system.

BACKGROUND OF THE INVENTION

During application code debugging, it is desirable for a target hardware platform to provide a hardware debug-support feature that enables code flow tracing information to be obtained during execution of the application code. An important aspect of such a hardware debug-support feature is that it does not affect (or minimally affects) the execution of the application code being debugged. Consequently, use of the primary resources and functionality of the hardware architecture by such a hardware debug-support feature should be minimal.

In high-end hardware architectures, it is known for such hardware debug-support to comprise either a dedicated trace buffer for storing code flow trace information obtained during execution of the application code for later access, or to comprise a fast access, for example via a high-speed connection, to an external trace memory (with a very small FIFO-buffer) whereby the code flow trace information obtained during execution of the application code may be offloaded to the external trace memory in real-time.

However, for cost sensitive devices such dedicated trace buffers and/or high-speed connections to external trace memory are prohibitively expensive to implement, and take up valuable die area. Conventionally, if no dedicated trace buffer or high-speed connection is available, code flow tracing information obtained during execution of the application code has to be stored in system-memory, which is then no longer available to the application code being debugged and thus can have an effect on the execution of the application code being debugged.

SUMMARY OF THE INVENTION

The present invention provides an Error Correction Code (ECC) component, a memory controller, a debug module, a processing system and a method of storing trace data within a processing system as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIGS. 2 and 3 illustrate examples of part of a memory element.

FIGS. 4 and 5 illustrates examples of trace data stored within an area of memory.

DETAILED DESCRIPTION OF THE PREFERRED EMBODIMENTS

Figure 1:
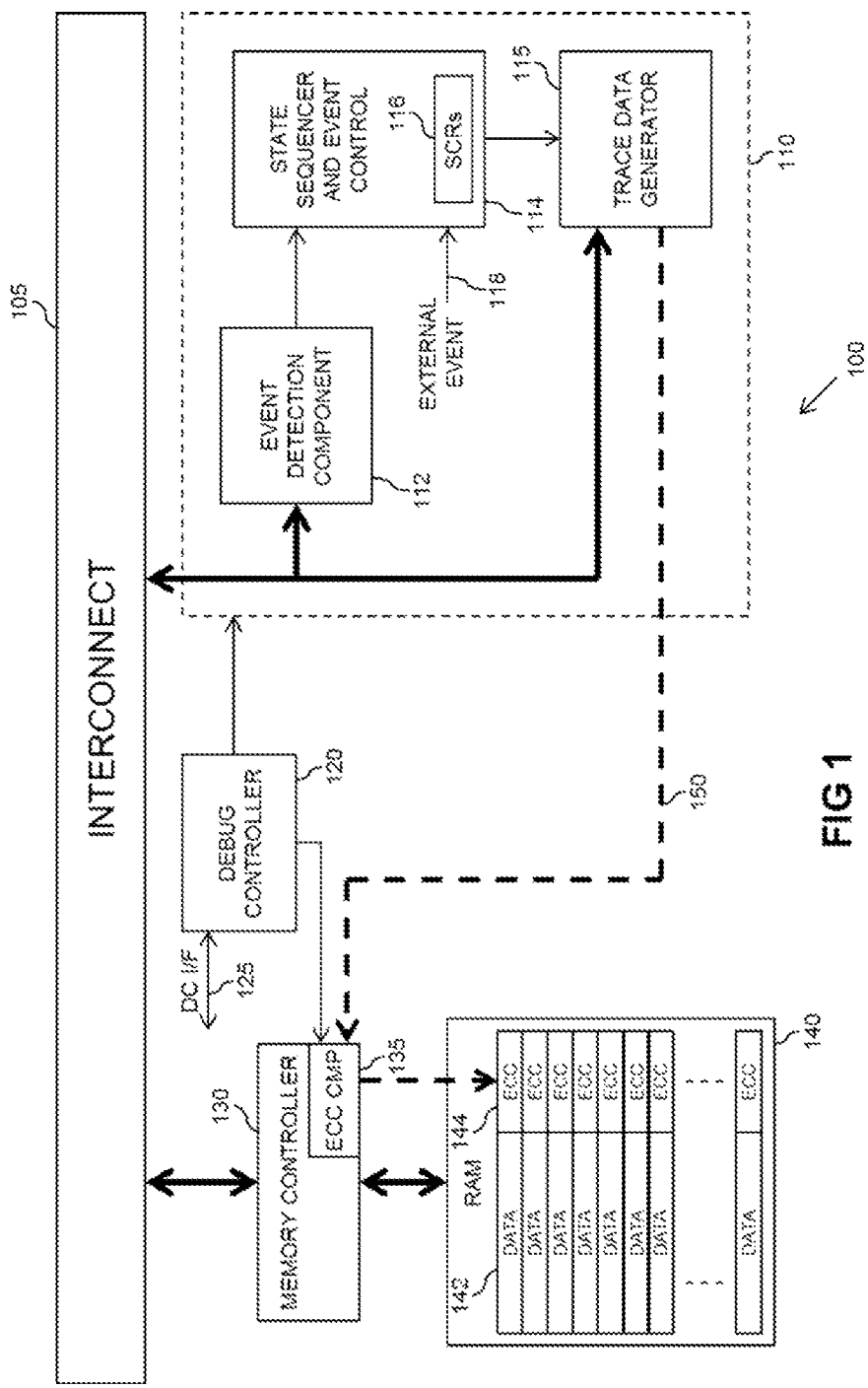
FIG. 1 illustrates a simplified block diagram of an example of a part of a processing system.

The present invention will now be described with reference to the accompanying drawings in which there is illustrated an example of a part of a processing system within which the present invention may be implemented. However, it will be appreciated that the present invention is not limited to the specific examples herein described and illustrated in the accompanying drawings. Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

In accordance with an example of a first aspect of the invention, there is provided an Error Correction Code (ECC) component configurable to operate in a first operating mode in which the ECC component is arranged to receive system data to be stored within a first area of at least one memory element, generate ECC information for the received system data, and cause the ECC information to be stored within a second area of the at least one memory element. The ECC component is further configurable to operate in at least one further operating mode in which the ECC component is arranged to receive trace data, and cause the received trace data to be stored within the second area of the at least one memory element.

In this manner, the area of memory used for storing ECC information during normal operation of the processing system may be used during application code flow tracing to store trace data 'on-chip' without the need for providing a dedicate trace buffer. In this manner, such trace data may be stored on-chip within cost sensitive hardware architectures without the need to use system memory, which could affect the execution of the application code being traced, and without the need for a relatively costly and area consuming trace buffer and/or fast access (high-speed connection) to an external trace memory.

In some optional examples, the ECC component may be arranged to cause the received trace data to be stored within the second area of the at least one memory element by outputting the trace data to a memory controller module.

In some optional examples, the ECC component may be arranged to cause the received trace data to be stored within the second area of the at least one memory element by writing the trace data directly to the second area of the at least one memory element.

In some optional examples, the ECC component may be further arranged to read out information stored within the second area of the at least one memory element, when configured to operate in the at least one further operating mode and upon receipt of an ECC memory access request.

In some optional examples, the ECC component may be arranged to free up memory space within the second area of the at least one memory element from which information is read out upon receipt of an ECC memory access request when configured to operate in the at least one further operating mode.

In some optional examples, the ECC component may be arranged to enable data stored within the second area of the at least one memory element to be read out prior to the second area of the at least one memory element being initialised upon a system reset.

In accordance with an example of a second aspect of the invention, there is provided a memory controller module for enabling access to at least one memory element within a processing system, the memory controller module comprising at least one ECC component according to the first aspect of the invention.

In accordance with an example of a third aspect of the invention, there is provided a debug module configurable to perform code flow tracing within a processing system and to generate trace data therefrom; wherein the debug module is arranged to output trace data to at least one ECC component according to the first aspect of the invention for storing in memory.

In accordance with an example of a fourth aspect of the invention, there is provided a processing system comprising at least one ECC component according to the first aspect of the invention.

In some optional examples, the processing system may further comprise at least one debug module configurable to perform code flow tracing within the processing system and to generate trace data therefrom; wherein the debug module is arranged to output trace data to the at least one Error Correction Code, ECC, component for storing in memory.

In some optional examples, the processing system may be implemented within an integrated circuit device comprising at least one die within a single integrated circuit package.

In accordance with an example of a fifth aspect of the invention, there is provided a method of storing trace data within a processing system. the method comprises configuring at least one ECC component within the processing system to operate in a trace data storage operating mode, generating trace data at a debug module of the processing system, and conveying the trace data from the debug module to the at least one ECC component for storing in an area of memory used for ECC information.

Referring now to FIG. 1, there is illustrated a simplified block diagram of an example of a part of a processing system 100. In some examples the processing system may be implemented within an integrated circuit device comprising at least one die within a single integrated circuit package. The processing system 100 comprises a debug module 110. In the illustrated example, the debug module 110 is operably coupled to a debug controller 120, whereby the debug module 110 may be configured over a debug controller serial interface 125 to an external debug tool (not shown). Alternatively, the debug module 110 may be configured via the host system (i.e. one or more core processors, not shown, of the processing system 110) using one or more software routine(s).

The debug module comprises an event detection component 112, for example comprising various comparators etc., arranged to detect events occurring within the processing system. In the illustrated example, the event detection component 112 is operably coupled to a system interconnect 105, such as may be implemented by way of a system bus or system crossbar switch component. The event detection component 112 is arranged to monitor interconnect activity of one or more master devices such as processing cores etc., not shown, of the processing system. Upon the event detection component 112 matching one or more interconnect activity(ies) with preconfigured parameters, for example addresses or address ranges etc., the event detection component 112 generates an event detection signal, which is output to a state sequencer 114. The state sequencer 114 may further be arranged to receive external event detection signals by way of an external event input 118.

In the illustrated example, when the debug module 110 is configured to perform code flow tracing for the processing system 100, transitions between the various states are controlled by state control registers 116 and depend upon receipt of event detection signals. Event detection signals, such as those output by the event detection component 112 and/or external event detection signals are used as qualifiers for a change of state within the state sequencer 114. A state control register 116 for a current state determines the next state for each event detection signal. For example, a detected event may initiate a transition to a next state sequencer state. The state control registers 116 also define actions to occur for each state, for example whether the code flow tracing for the processing system 100 is to be enabled/disabled upon entering a particular state. For example, upon entering a particular state, the state control register 116 for that state may define that code flow tracing is to be enabled; in which case the state sequencer 114 outputs an enable code flow tracing signal to, in the illustrated example, a trace data generator 115. Conversely, upon entering a state for which the state control register 116 defines that code flow tracing is to be disabled, the state sequencer 114 outputs a disable code flow tracing signal to the trace data generator 115. In this manner, the state sequencer 114 allows a defined sequence of events to provide, for example, a trigger point for the tracing of data.

In the illustrated example, the trace data generator 115 is operably coupled to the system interconnect 105, and upon receipt of an enable code flow tracing signal from the state sequencer 114 is arranged to generate trace data based on code flow information read from the interconnect 105.

During application code debugging, it is desirable for the debug module 110 to enable code flow tracing information to be obtained during execution of the application code whilst minimizing the use of the primary resources and functionality of the hardware architecture, and in particular the use of system memory. Furthermore, for cost sensitive hardware architectures such code flow tracing information is required to be obtained without the availability of a dedicated trace buffer or a fast access (high-speed connection) to an external trace memory.

In many processing hardware architectures, it is known to provide Error Correction Code (ECC) functionality within, or operably coupled to, memory controller modules. In the example illustrated in FIG. 1, the processing system comprises a memory controller module 130 operably coupled between the system interconnect 105 and one or more memory elements, such as the Random Access Memory (RAM) element illustrated at 140. The memory controller module 130 is arranged to enable access to the memory element 140. In particular, the memory controller module 130 is arranged to receive write access requests from, say, processing cores (not shown) or direct memory access (DMA) modules (not shown) of the processing system 100 over the system interconnect 105, and store the data within the received write access requests in a first area 142 of the memory element 140. The memory controller module 130 is further arranged to receive read access requests from, say, processing cores (not shown) or direct memory access (DMA) modules (not shown) of the processing system 100 over the system interconnect 105, and to read data from the first area 142 of the memory element 140 corresponding to the received read access requests, and to return the read data from the requesting components.

Figures 2, 3, 4, 5:
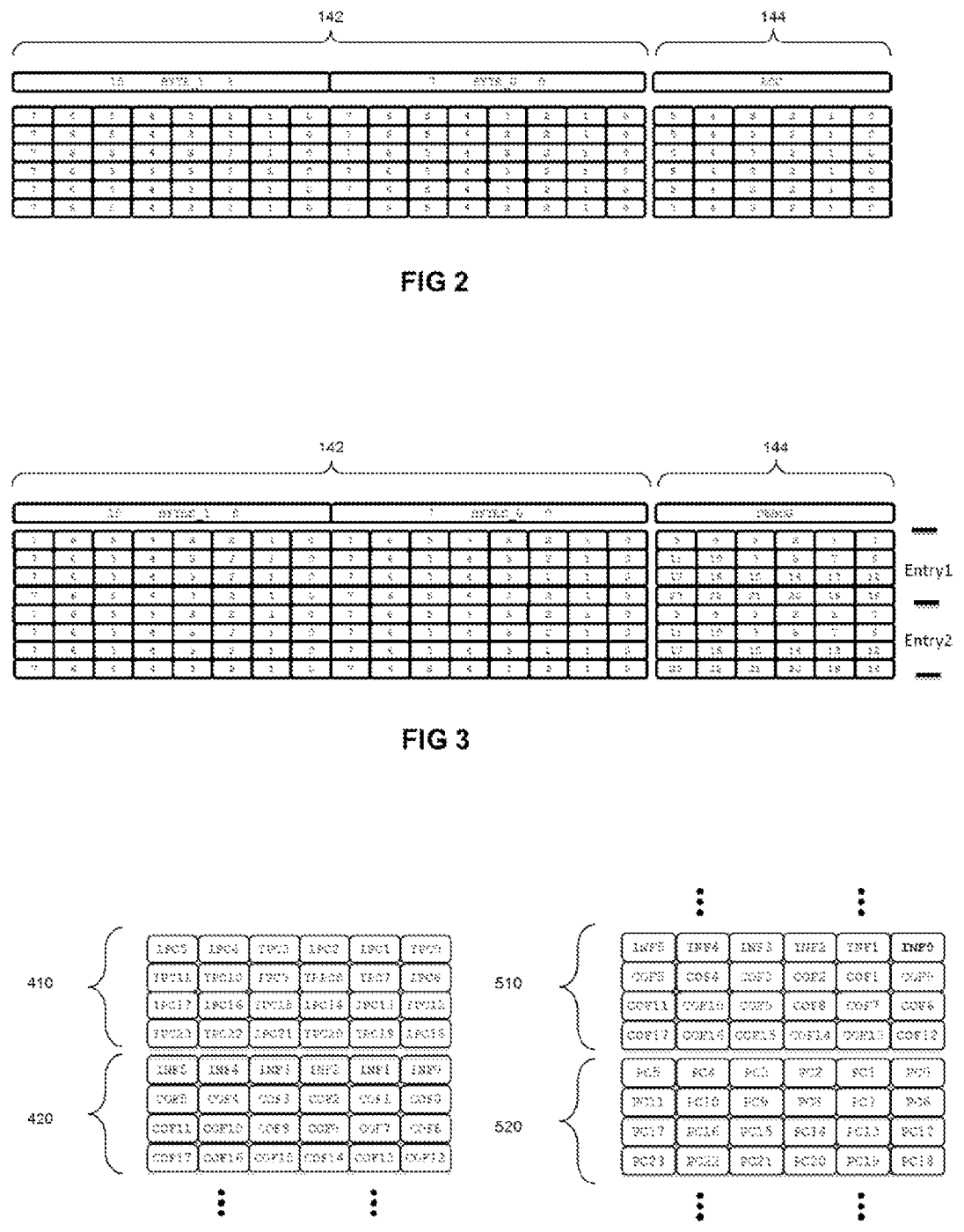

An ECC component 135, which in the illustrated example forms a part of the memory controller module 130, is configurable to operate in a first, ECC operating mode in which the ECC component is arranged to receive data to be written to the memory element 140, and generate ECC information which is stored in a second area 144 of the memory element 140. For example, and as illustrated in FIG. 2, the memory element 140 may be arranged such that data is written to memory in the form of 16-bit words, each word being individually addressable and comprising a first byte, byte_0, comprising bits 0 to 7 and a second byte, byte_1, comprising bits 8 to 15. In the illustrated example, the first area of memory 142 is made up of these 16-bit words. Each byte has associated therewith 6 ECC bits, which combined make up the second area of memory 144. Accordingly, when configured to operate in the first, ECC operating mode, the ECC component 135 may be arranged to receive data comprising 16 bits to be written to an individually addressable 16-bit row of the memory element 140, and to generate 6 bits of ECC information. The ECC information generated by the ECC component 135 is stored in the ECC bits corresponding to the individually addressable row of the memory element 140 within which the respective data is to be stored. The ECC component 135 may be arranged to provide the ECC information to the memory controller module 130, which then writes the data and ECC information therefor to the memory element 140 in a single write operation to the combined 22-bit data and ECC row in memory. Alternatively, the ECC component 135 may be arranged to write the ECC information directly to the ECC bits of the respective row in the memory element 140.

The use of such ECC information, which is stored in memory alongside the data to which it relates, is well known in the art, and enables data being read from memory to be validated against its corresponding ECC information to detect, and where possible correct, any internal data corruption that may have occurred to the data whilst stored in memory. However, the inventors have recognized that such ECC protection is not required during application code debugging, since during such debugging data is not stored within memory for sufficiently long periods of time for the internal corruption of data to be likely to occur. As such, the inventors have identified that the ECC bits in memory, i.e. the second area of memory 144 illustrated in FIGS. 1 and 2 that are used during normal operation of the processing system 100, may be utilized for other purposes during application code debugging. Specifically, the inventors have identified that these ECC bits in memory may be used to store code flow trace information generated during application code debugging.

Referring back to FIG. 1, the ECC component 135 is further configurable to operate in a further, trace data storage operating mode in which the ECC component 135 is arranged to receive trace data from the debug module 110, and to cause the received trace data to be stored within the second area 144 of the memory element 140. For example, the ECC component may be arranged to cause the received trace data to be stored within the second area 144 of the memory element 140 by outputting the trace data to the memory controller module 130. The memory controller module 130 may then write the trace data to the second area 144 of memory during free cycles, for example by performing a read-modify-write operation of a complete 22-bit (data+ECC) row in the memory element 140. Alternatively, where the ECC bit lines are independently accessible, the ECC component 135 or the memory controller 130 may be arranged to write the trace data directly to the second area 144 of the memory element 140, thereby allowing immediate updating of the trace data stored in memory, without having to wait for fee cycles during the execution of the application code being debugged.

Furthermore, the debug module 110 is arranged to output trace data to the ECC component 130 for storing in the second area 144 of the memory element 140, as indicated generally by the broken arrow 150. The trace data may be conveyed to the ECC component 130 in any suitable manner. For example, the trace data generator 115 of the debug module 110 may be arranged to send the trace data generated thereby to the ECC component 135 via the system interconnect 105, thereby minimizing the architectural changes required to implement the invention. Alternatively, a dedicated communication link may be provided between the trace data generator 150 and the ECC component 135 and/or the memory controller module 130. In this manner, the creation of additional traffic on the system interconnect 105 during debugging may be avoided.

Referring now to FIGS. 3 and 4, there are illustrated examples of the storing of trace data within the second area 144 of the memory element 140. Referring first to FIG. 3, in the illustrated example, a trace data entry comprises 24-bits. Accordingly, each trace data entry is stored within four 6-bit ECC data lines. FIG. 4 illustrates an example of two 24-bit trace data entries. The first entry 410 contains an initial 24-bit program counter (PC) address. The following entry 420 contains change of flow information. In the illustrated example, the first 6-bit field of an entry (other than an entry containing an initial PC address) contains information defining the following bit format. The second 18-bit field contains the change of flow information. The information bits may also indicate if the following 24-bit entry is dedicated to an indirect change of flow or contains direct change of flow information. For example, in FIG. 4 the second 24-bit entry 420 contains direct change of flow information (COF). In this example, each direct change of flow is stored as a single bit: 1=branch taken; 0=branch not taken. Direct change of flow information is stored within the second 18-bit field of an entry until an indirect change of flow occurs. In the illustrated example, the left most asserted bit in the 18-bit field is always a stop bit. The bit to the right of the stop bit is the last direct change of flow before an indirect change of flow. If no indirect change of flow occurs then bit 17 of the 18-bit field is set and the next 24-bit entry field contains direct change of flow information.

FIG. 5 illustrates a further example of two 24-bit trace data entries within a tracing sequence stored within the second area 144 of the memory element 140. In the example illustrated in FIG. 5 the first of the two illustrated 24-bit entries 510 contains direct change of flow information. A first 6-bit field of the first of the two illustrated 24-bit entries 510 contains information defining the following bit format, with the second 18-bit field containing the change of flow information. The information bits also indicate that the second of the two 24-bit entries 520 illustrated in FIG. 5 is dedicated to an indirect change of flow. The second of the two illustrated 24-bit entries 520 contains indirect change of flow information (PC), which in the illustrated example comprises an indexed destination address. If an indirect change of flow entry corresponds to an indexed jump, then the destination address may be stored as the 24-bit entry. Conversely, if an indirect change of flow entry corresponds to a vector, then the vector+timestamp may be stored as the 24-bit entry (8-bit vector+16-bit timestamp).

Referring now to FIGS. 6 to 9, there are illustrated simplified flowcharts of an example of a method of storing trace data within a processing system, such as may be implemented within the processing system 100 of FIG. 1.

Figure 6:
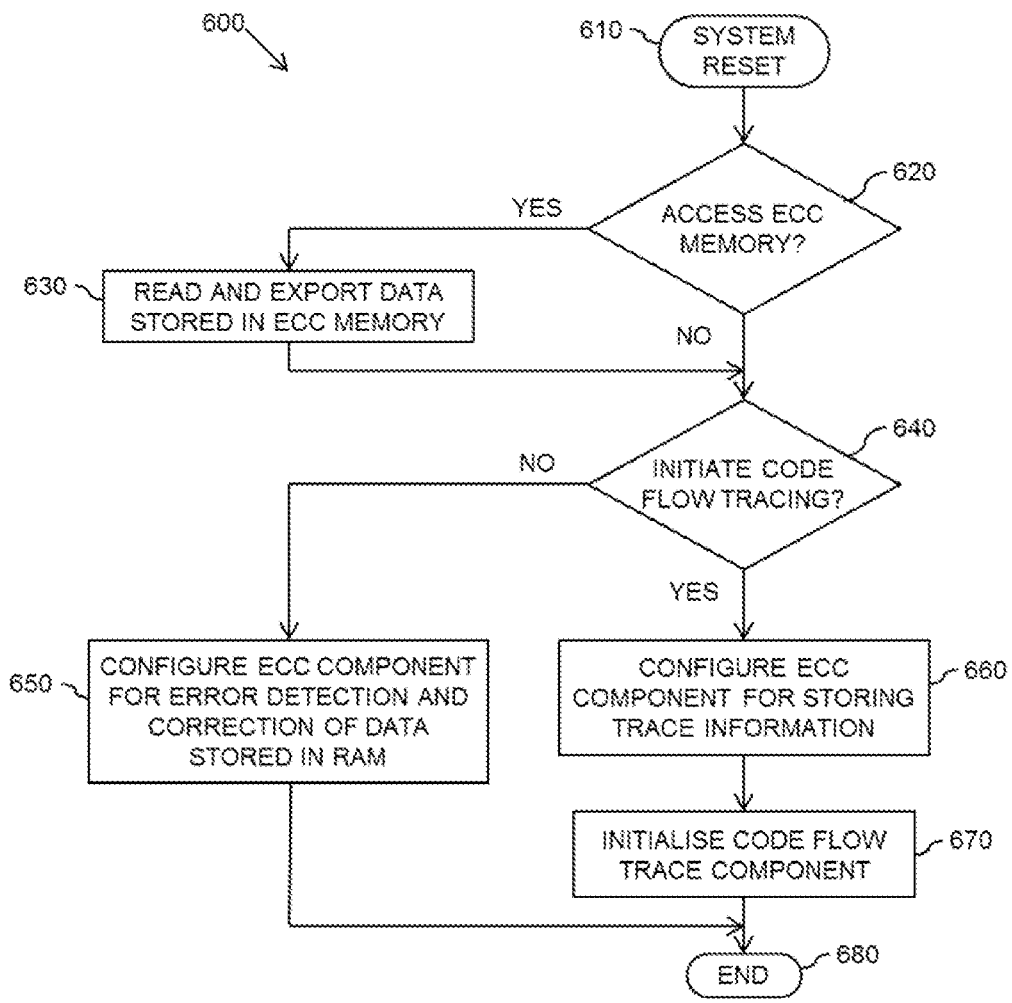
FIGS. 6 to 9 illustrate simplified flowcharts of an example of a method of storing trace data within a processing system.

Referring first to FIG. 6, there is illustrated a simplified flowchart 600 of an example of a part of the method of storing trace data within a processing system. In some examples, this part of the method may be implemented within, say, a debug controller such as the debug controller 120 illustrated in FIG. 1. This part of the method starts at 610 with a system reset, and moves on to 620 where in the illustrated example it is determined whether data stored within an area of memory used for ECC information, such as the second area 144 of the memory element 140 of FIG. 1, is required to be accessed (i.e. read out). For example, the debug controller 120 of FIG. 1 may be arranged to determine whether data (e.g. trace data) stored within the second area 144 of memory is to be read out upon a system reset based on a bit set within a configuration register (not shown) thereof.

If it is determined that data stored within the area of memory used for ECC information is to be read out, the method moves on to 630 where data stored in the area of memory used for ECC information is read out and exported, for example to an external debug tool or the like via debug interface 125 or the like. For example, the debug controller 120 of FIG. 1 may be arranged to send a read access request, or some other indication, to the memory controller 130 and/or ECC component 135, which in turn read(s) the (trace) data stored in the second area 144 of memory and return(s) the read data to the debug controller 120. In this manner data, such as trace data, stored within the ECC memory during a previous application code execution may be read out prior to the memory being initialized upon a system reset. The method then moves on to 640. Conversely, if it is determined that data stored within the area of memory used for ECC information is not to be read out, the method moves directly on to 640.

At 640, it is determined whether application code flow tracing is to be performed. For example, the debug controller 120 of FIG. 1 may be arranged to determine whether application code flow tracing is to be performed based on a bit set within a configuration register (not shown) thereof. If it is determined that application code flow tracing is not to be performed, the method moves on to 650, where the, or each, ECC component of the processing system is configured to operate in a first, ECC operating mode in which the ECC component is arranged to receive data to be written to the memory element 140, and generate ECC information which is stored in an area thereof, such as the second area of memory 144 of the memory element 140 of FIG. 1. This part of the method then ends at 680. Conversely, if it is determined that application code flow tracing is to be performed, the method moves on to 660, where at least one ECC component of the processing system is configured to operate in a further, trace data storage operating mode in which the (at least one) ECC component is arranged to receive trace data, and to cause the received trace data to be stored within the area of memory normally used for ECC information, such as second area 144 of the memory element 140 of FIG. 1. Application code flow tracing component, such as the debug module 110 of FIG. 1, is then initialised to perform application code flow tracing at 670. This part of the method then ends, at 680.

Figure 7:
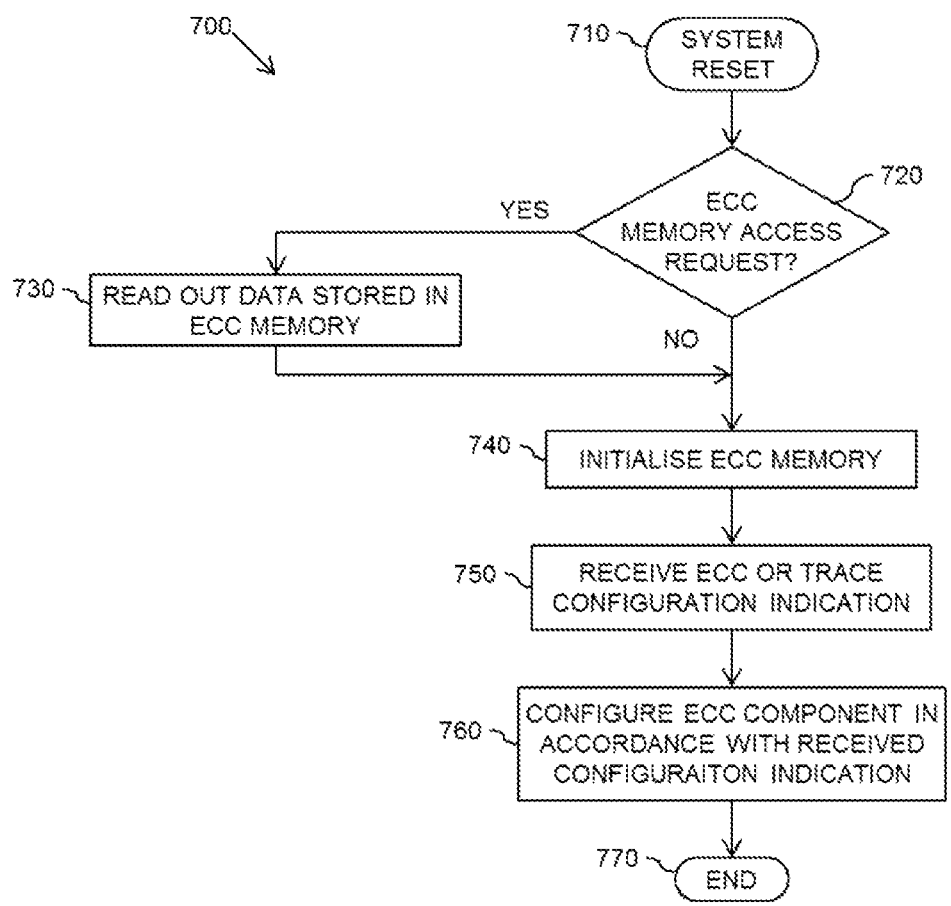

Referring now to FIG. 7 there is illustrated a simplified flowchart 700 of an example of a further part of the method of storing trace data within a processing system. In some examples, this part of the method may be implemented within, say, an ECC component of the processing system, such as the ECC component 135 of the processing system 100 of FIG. 1. This part of the method starts at 710 with a system reset, and moves on to 720 where in the illustrated example it is determined whether data stored within an area of memory used for ECC information, such as the second area 144 of the memory element 140 of FIG. 1, is required to be accessed (i.e. read out). For example, the ECC component 135 of FIG. 1 may be arranged to determine whether data (e.g. trace data) stored within the second area 144 of memory is to be read out based on an memory access request, or other indication, received from the debug controller 120. If it is determined that data stored within the ECC memory is to be read out, the method moves on to 730 where the data stored in the ECC memory is read and output to, say, the debug controller 120 of FIG. 1. In this manner data, such as trace data, stored within the ECC memory during a previous application code execution may be read out prior to the memory being initialized upon a system reset. The method then moves on to 740. Conversely, if it is determined that data stored within the area of memory used for ECC information is not to be read out, the method moves directly on to 740.

At 740, the area of memory used for ECC information, such as the second area of memory 144 of the memory element 140 of FIG. 1, is initialized (e.g. all bits within the area of memory set to a 0 value). Next, at 750, a configuration indication for the ECC component is received, indicating what operating mode the ECC component should be configured to operate in. For example, such an indication may be received from the debug controller 120 of FIG. 1, and may indicate whether the ECC component 135 is to operate in a first, ECC operating mode in which the ECC component 135 is arranged to receive data to be written to the memory element 140, and generate ECC information which is stored in the second area of memory 144, or a further, trace data storage operating mode in which the at least one ECC component 135 is arranged to receive trace data, and to cause the received trace data to be stored within the second area of memory 144. The ECC component is then configured to operate in an operating mode according to the received indication, at 760, and the method ends at 770.

Figure 8:
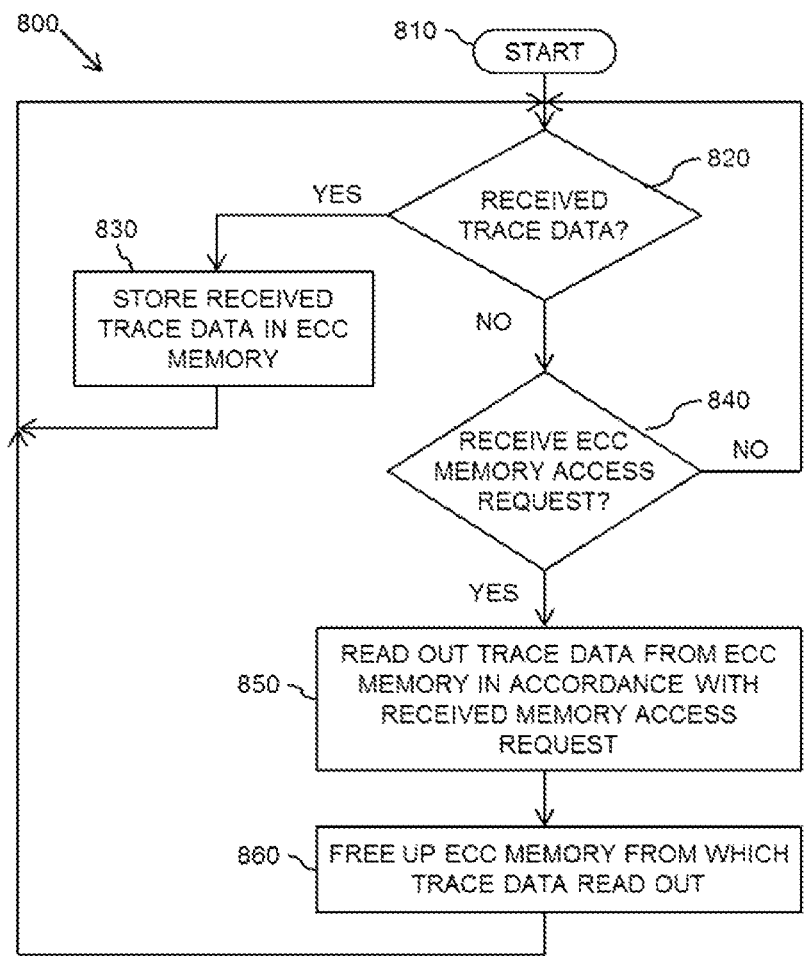

Referring now to FIG. 8 there is illustrated a simplified flowchart 800 of an example of a still further part of the method of storing trace data within a processing system. In some examples, this part of the method may be implemented within, say, an ECC component of the processing system, such as the ECC component 135 of the processing system 100 of FIG. 1, when configured to operate in a trace data storage operating mode. This part of the method starts at 810, and moves on to 820. If trace data has been received, for example from a debug module such as the debug module 110 of FIG. 1, the method moves on to 830 where the received trace data is stored in ECC memory. For example, the ECC component 135 in FIG. 1 may be arranged to cause the received trace data to be stored within the second area 144 of the memory element 140 by outputting the trace data to the memory controller module 130. The memory controller module 130 may then write the trace data to the second area 144 of memory during free cycles, for example by performing a read-modify-write operation of a complete 22-bit (data+ECC) row in the memory element 140. Alternatively, where the second area of memory 144 is independently accessible, the ECC component 135 or the memory controller 130 may be arranged to write the trace data directly to the second area 144 of the memory element 140, thereby allowing immediate updating of the trace data stored in memory, without having to wait for fee cycles during the execution of the application code being debugged. The method then loops back to 820.

If trace data has not been received at 820, the method moves on to 840 where it is determined whether an ECC memory access request has been received, for example from the debug controller 120 on FIG. 1. If no such ECC memory access request has been received the method loops back to 820. Conversely, if an ECC memory access request has been received the method moves on to 850 where trace data stored in the ECC memory (e.g. the second area of memory 144 in FIG. 1) is read out of the memory in accordance with the received memory access request, and returned to the requestor, for example the debug controller 120 in the example illustrated in FIG. 1. In this manner, trace data stored within the ECC memory may be accessed and output to, say, an external debug tool or the like during application code execution. In the illustrated example, the part of the ECC memory from which the trace data is read out from is then freed up so that it may be reused for storing subsequently received trace data. Advantageously, by enabling stored trace data to be read out and the memory space then freed up and reused enables a larger profiling depth to be achieved during application code flow tracing. The method then loops back to 820.

Figure 9:
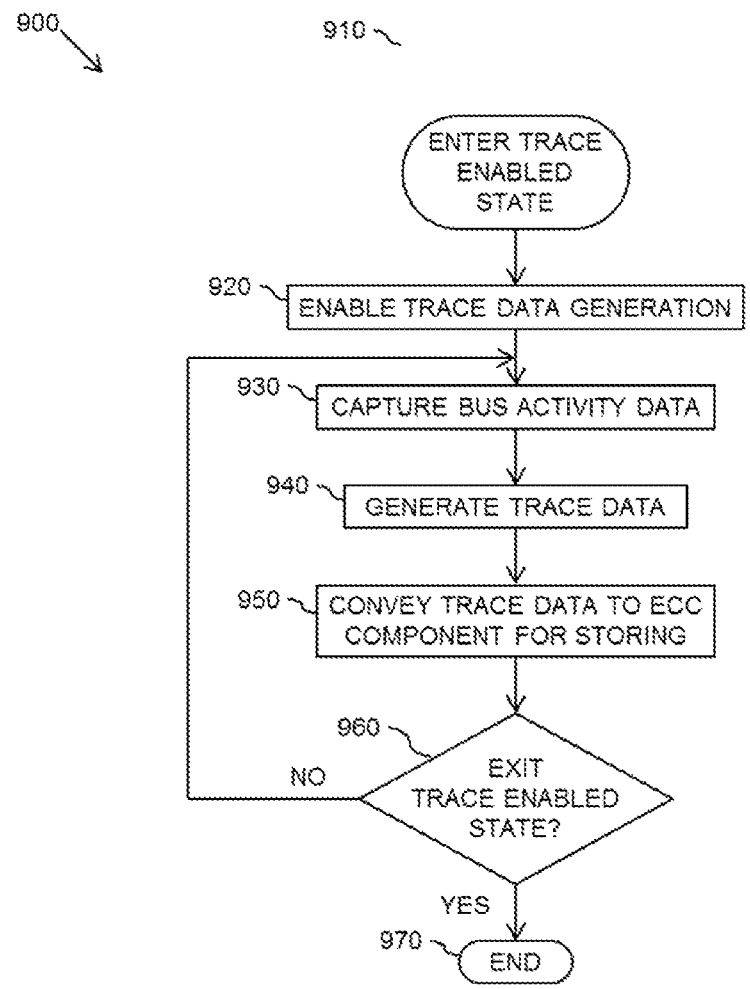

Referring now to FIG. 9 there is illustrated a simplified flowchart 900 of an example of a still further part of the method of storing trace data within a processing system. In some examples, this part of the method may be implemented within, say, a debug module, such as the debug module 110 of the processing system 100 of FIG. 1. This part of the method starts at 910 with a trace enabled state being entered. Next, at 920, trace data generation is enabled. Bus activity data is then captured, at 930 and trace data is generated based (at least partly) on the captured bus activity data. The generated trace data is then conveyed to one or more ECC component(s) for storing in an area of memory used for ECC data, such as the second area 144 in FIG. 1. In the illustrated example, the method loops back to 930 until an indication that the trace enabled state is to be exited, at 960. Upon receipt of an indication that the trace enabled state is to be exited, the method ends at 970.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials may have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or an limits any particular claim containing such introduced claim element to inventions containing only one such element, even when the same claim includes the introductory phrases one or more or at least one and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An Error Correction Code, ECC, component configurable to operate in a first operating mode in which the ECC component is arranged to:
receive system data to be stored within a first area of at least one memory element;
generate ECC information for the received system data; and
cause the ECC information to be stored within a second area of the at least one memory element,
wherein the ECC component is further configurable to operate in at least one further operating mode in which the ECC component is arranged to:
receive trace data; and
cause the received trace data to be stored within the second area of the at least one memory element.

2. The ECC component of claim 1, wherein the ECC component is arranged to cause the received trace data to be stored within the second area of the at least one memory element by outputting the trace data to a memory controller module.

3. The ECC component of claim 1, wherein the ECC component is arranged to cause the received trace data to be stored within the second area of the at least one memory element by writing the trace data directly to the second area of the at least one memory element.

4. The ECC component of claim 1, wherein the ECC component is further arranged to read out information stored within the second area of the at least one memory element, when configured to operate in the at least one further operating mode and upon receipt of an ECC memory access request.

5. The ECC component of claim 4, wherein the ECC component is arranged to free up memory space within the second area of the at least one memory element from which information is read out upon receipt of an ECC memory access request when configured to operate in the at least one further operating mode.

6. The ECC component of claim 1, wherein the ECC component is arranged to enable data stored within the second area of the at least one memory element to be read out prior to the second area of the at least one memory element being initialised upon a system reset.

7. A processing system comprising at least one Error Correction Code, ECC, component, the EEC component arranged to:
receive system data to be stored within a first area of at least one memory element;
generate ECC information for the received system data; and
cause the ECC information to be stored within a second area of the at least one memory element,
wherein the ECC component is further configurable to operate in at least one further operating mode in which the ECC component is arranged to:
receive trace data; and
cause the received trace data to be stored within the second area of the at least one memory element.

8. The processing system of claim 7, wherein the processing system further comprises at least one debug module configurable to perform code flow tracing within the processing system and to generate trace data therefrom; wherein the debug module is arranged to output trace data to the at least one Error Correction Code, ECC, component for storing in memory.

9. The processing system of claim 7 implemented within an integrated circuit device comprising at least one die within a single integrated circuit package.

10. The processing system of claim 7, wherein the ECC component is arranged to cause the received trace data to be stored within the second area of the at least one memory element by outputting the trace data to a memory controller module.

11. The processing system of claim 7, wherein the ECC component is arranged to cause the received trace data to be stored within the second area of the at least one memory element by writing the trace data directly to the second area of the at least one memory element.

12. The processing system of claim 7, wherein the ECC component is further arranged to read out information stored within the second area of the at least one memory element, when configured to operate in the at least one further operating mode and upon receipt of an ECC memory access request.

13. The processing system of claim 7, wherein the ECC component is arranged to free up memory space within the second area of the at least one memory element from which information is read out upon receipt of an ECC memory access request when configured to operate in the at least one further operating mode.

14. A method of storing trace data within a processing system; the method comprising:
configuring at least one Error Correction Code, ECC, component within the processing system to operate in a trace data storage operating mode;
generating trace data at a debug module of the processing system; and
conveying the trace data from the debug module to the at least one ECC component for storing in an area of memory used for ECC information.

15. The method of claim 14, further comprising:
operating the at least one ECC component in a first operating mode, wherein while the at least one ECC component is operating in the first operating mode:
receiving system data to be stored within a first area of the memory;
generating, by the at least one ECC component, ECC information for the received system data; and
causing, by the at least one ECC component, the ECC information to be stored within the area of the memory used for ECC information.

16. The method of claim 14, further comprising:
outputting the trace data to a memory controller module to cause the received trace data to be stored within the area of the memory used for ECC information.

17. The method of claim 14, further comprising:
writing the trace data directly to the area of the memory used for ECC information to cause the received trace data to be stored within the area of the memory used for ECC information.

18. The method of claim 14, further comprising:
reading, by the ECC component, out information stored within the area of the memory used for ECC information, when configured to operate in the trace data storage operating mode and upon receipt of an ECC memory access request.

19. The method of claim 14, further comprising:
freeing up, by the ECC component, memory space within the area of the memory used for ECC information from which information is read out upon receipt of an ECC memory access request when configured to operate in the trace data storage operating mode.

20. The method of claim 14, further comprising:
enabling, by the ECC component, data stored within the area of the memory used for ECC information to be read out prior to the area of the memory used for ECC information being initialized upon a system reset.

\* \* \* \* \*